United States Patent
Foye et al.

(10) Patent No.: US 9,733,002 B2
(45) Date of Patent: *Aug. 15, 2017

(54) SCREW COMPRESSOR DRIVE CONTROL

(71) Applicant: Trane International Inc., Piscataway, NJ (US)

(72) Inventors: David M. Foye, LaCrosse, WI (US); Nathan T. West, Holmen, WI (US); Dennis M. Beekman, LaCrosse, WI (US); John R. Sauls, LaCrosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 322 days.

This patent is subject to a terminal disclaimer.

(21) Appl. No.: 14/532,241

(22) Filed: Nov. 4, 2014

(65) Prior Publication Data

US 2015/0052921 A1 Feb. 26, 2015

Related U.S. Application Data

(63) Continuation of application No. 13/759,728, filed on Feb. 5, 2013, now Pat. No. 8,875,530, which is a
(Continued)

(51) Int. Cl.
*F25B 49/00* (2006.01)
*F04C 18/16* (2006.01)
*F25B 49/02* (2006.01)
*F04C 28/08* (2006.01)
(Continued)

(52) U.S. Cl.
CPC ............ *F25B 49/022* (2013.01); *F04B 35/04* (2013.01); *F04C 18/00* (2013.01); *F04C 18/16* (2013.01);
(Continued)

(58) Field of Classification Search
CPC ...... F25B 49/022; F25B 49/025; F25B 1/047; F25B 2600/02; F25B 2600/0253;
(Continued)

(56) References Cited

U.S. PATENT DOCUMENTS 4,604,036 A 8/1986 Sutou et al.
5,067,560 A 11/1991 Carey et al.
(Continued)

FOREIGN PATENT DOCUMENTS

DE 10258540 6/2004
EP 1277959 1/2003
(Continued)

OTHER PUBLICATIONS

International Search Report and Written Opinion for PCT/US2010/045838, dated Jul. 30, 2013.

*Primary Examiner* — Marc Norman
(74) *Attorney, Agent, or Firm* — Hamre, Schumann, Mueller & Larson, P.C.

(57) ABSTRACT

An embodiment of method used to control operation of a screw compressor of a refrigeration system may include receiving status signals regarding operation of the screw compressor of the refrigeration system. The method may further include determining an operating point of the screw compressor based upon the received status signals, and selecting a torque profile for the screw compressor based upon the operating point. The method may also include driving the screw compressor per the selected torque profile. Refrigeration systems and compressor systems suitable for implementing the method are also presented.

16 Claims, 3 Drawing Sheets

Related U.S. Application Data continuation of application No. 12/544,582, filed on Aug. 20, 2009, now Pat. No. 8,365,544.

(51) Int. Cl.
  *F25B 1/047* (2006.01)
  *F04C 18/00* (2006.01)
  *F04B 35/04* (2006.01)

(52) U.S. Cl.
  CPC .............. *F04C 28/08* (2013.01); *F25B 1/047* (2013.01); *F25B 49/025* (2013.01); *F04C 2240/403* (2013.01); *F04C 2240/81* (2013.01); *F04C 2270/03* (2013.01); *F25B 2600/02* (2013.01); *F25B 2600/0253* (2013.01); *Y02B 30/741* (2013.01)

(58) Field of Classification Search
  CPC .......... F04B 35/04; F04C 18/00; F04C 18/16; F04C 28/08; F04C 2240/403; F04C 2240/81; F04C 2270/03; Y02B 30/741
  See application file for complete search history.

(56) References Cited

U.S. PATENT DOCUMENTS

| | | | |
|---|---|---|---|
| 5,832,737 | A | 11/1998 | Moilanen |
| 5,979,168 | A | 11/1999 | Beekman |
| 6,116,046 | A | 9/2000 | Leaver et al. |
| 6,606,872 | B1 | 8/2003 | Smith |
| 7,387,498 | B2 | 6/2008 | Schnetzka et al. |
| 7,770,806 | B2 | 8/2010 | Herzon et al. |
| 8,365,544 | B2 | 2/2013 | Foye et al. |
| 8,875,530 | B2 * | 11/2014 | Foye ................. F04C 18/16 417/19 |
| 2006/0272343 | A1 | 12/2006 | Takahashi et al. |
| 2007/0180841 | A1 | 8/2007 | Bae et al. |
| 2008/0292470 | A1 | 11/2008 | Sawada et al. |

FOREIGN PATENT DOCUMENTS

| | | |
|---|---|---|
| JP | 2006017041 | 1/2006 |
| JP | 2006223097 | 8/2006 |

* cited by examiner

SCREW COMPRESSOR DRIVE CONTROL

RELATED APPLICATIONS

This application is a continuation of U.S. patent application Ser. No. 13/759,728, filed Feb. 5, 2013, which is a continuation of U.S. patent application Ser. No. 12/544,582, filed Aug. 20, 2009, now U.S. Pat. No. 8,365,544, the disclosure of each of the above applications is incorporated herein by reference in its entirety.

BACKGROUND

Compressors in refrigeration systems raise the pressure of a refrigerant from an evaporator pressure to a condenser pressure. The evaporator pressure is sometimes referred to as the suction pressure and the condenser pressure is sometimes referred to as the discharge pressure. At the discharge pressure, the refrigerant is capable of cooling a desired medium. Many types of compressors, including rotary screw compressors, are used in such refrigeration systems.

A screw compressor includes a suction port and a discharge port that open into a working chamber of the screw compressor. The working chamber includes a pair of meshed screw rotors that define a compression pocket between the screw rotors and interior walls of the working chamber. Refrigerant is received by the suction port and delivered to the compression pocket. Rotation of the rotors closes the compression pocket from the suction port and decreases the volume of the compression pocket as the rotors move the refrigerant toward the discharge port. Due to decreasing the volume of the compression pocket, the rotors deliver the refrigerant to the discharge port at an discharge pressure that is greater than the suction pressure.

SUMMARY OF THE DISCLOSURE

Embodiments of refrigeration systems, compressor systems and methods to control screw compressors of such systems are disclosed. An embodiment of a method of controlling operation of a screw compressor of a refrigeration system may include receiving status signals regarding operation of the screw compressor of the refrigeration system. The method may further include determining an operating point of the screw compressor based upon the received status signals, and selecting a torque profile for the screw compressor based upon the operating point. The method may also include driving the screw compressor per the selected torque profile. Embodiments of refrigeration systems, compressor systems suitable for implementing disclosed embodiments of controlling operation of a screw compressor are also presented.

Those skilled in the art will appreciate advantages and superior features of the above embodiments, together with other important aspects thereof upon reading the detailed description which follows in conjunction with the drawings.

BRIEF DESCRIPTION OF THE DRAWINGS

Embodiments are described herein by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes refrigeration systems, compressor systems and techniques to control compressors of such systems. In the following description, numerous specific details are set forth in order to provide a more thorough understanding of the described systems and techniques. However, one skilled in the art readily appreciates that the various embodiments of the described systems and techniques may be practiced without such specific details. In other instances, specific aspects of the described systems and techniques have not been shown or described in detail in order not to obscure other aspects of the described systems and techniques.

References in the specification to "one embodiment", "an embodiment", "an example embodiment", etc., indicate that the described embodiment may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, other embodiments may incorporate or otherwise implement such feature, structure, or characteristic whether or not explicitly described.

Some aspects of the described systems and techniques may be implemented in hardware, firmware, software, or any combination thereof. Some aspects of the described systems may also be implemented as instructions stored on a machine readable medium which may be read and executed by one or more processors. A machine readable medium may include any storage device to which information may be stored in a form readable by a machine (e.g., a computing device). For example, a machine readable medium may include read only memory (ROM); random access memory (RAM); magnetic disk storage media; optical storage media; flash memory devices; and others.

Figure 1:
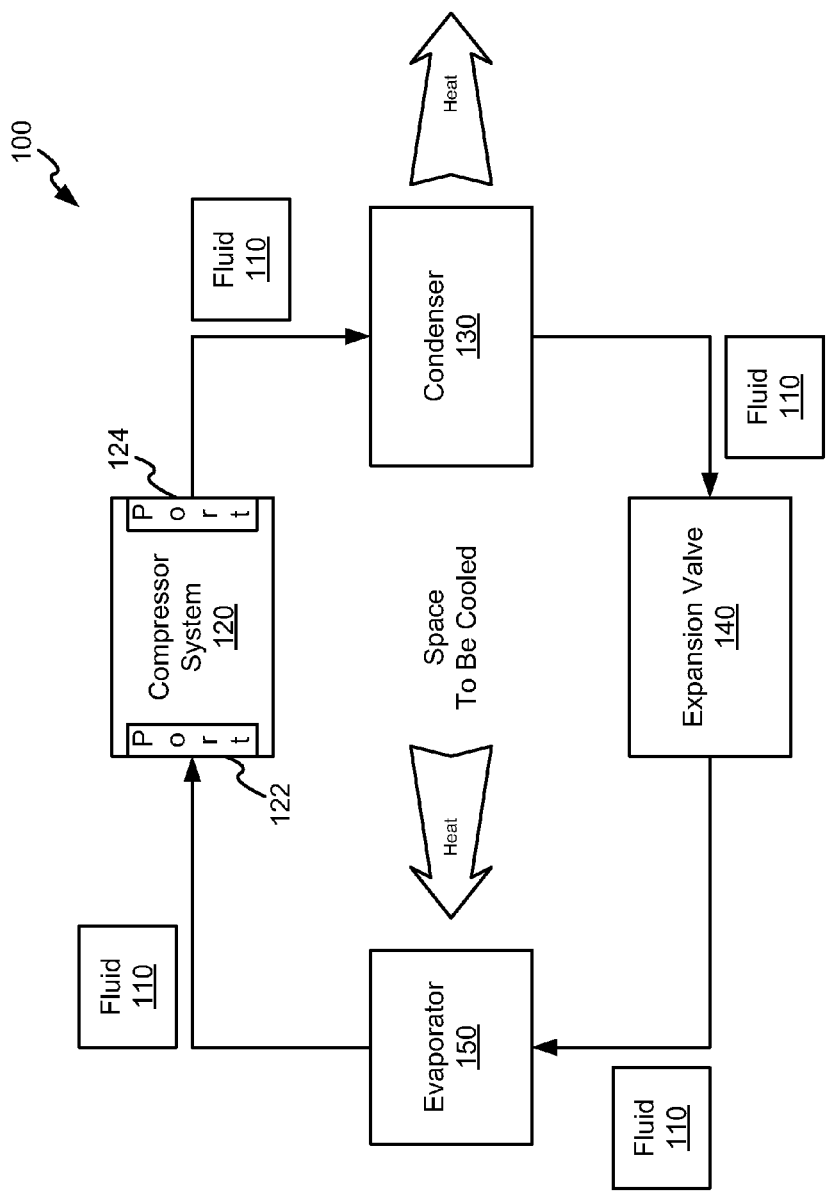
FIG. 1 shows an embodiment of a refrigeration system comprising a compressor system.

Referring now to FIG. 1, an embodiment of a refrigeration system 100 is depicted. The refrigeration system 100 may circulate a fluid 110 such as, for example, a liquid refrigerant in order to cool a space such as a room, home, or building. The circulated fluid 110 may absorb and remove heat from the space to be cooled and may subsequently reject the heat elsewhere. As shown, the refrigeration system 100 may include a compressor system 120, a condenser 130 coupled to the condenser system 120, an expansion valve 140 coupled to the condenser 130, and an evaporator 150 coupled between the compressor system 120 and the expansion valve 140.

The compressor system 120 may include a suction port 122 and a discharge port 124. The suction port 122 of the compressor system 120 may receive the fluid 110 in a thermodynamic state known as a saturated vapor. The compressor system 120 may compress the fluid 110 as the compressor system 120 transfers the fluid 110 from the suction port 122 to the discharge port 124. In particular, the suction port 122 may receive the fluid 110 at a suction pressure and suction temperature. The compressor system 120 may compress the fluid 110 and may discharge the compressed fluid 110 via the discharge port 124 at a discharge pressure that is higher than the suction pressure. Compressing the fluid 110 may also result in the fluid 110 being discharged at a discharge temperature that is higher than the suction temperature. The fluid 110 discharged from the discharge port 124 may be in a thermodynamic state known as a superheated vapor. Accordingly, the fluid 110 discharged from the compressor system 120 may be at a temperature and pressure at which the fluid 110 may be readily condensed with cooling air or cooling liquid.

The condenser 130 may be coupled to the discharge port 124 of the compressor system 120 to receive the fluid 110. The condenser 130 may cool the fluid 110 as the fluid 110 passes through the condenser 130 and may transform the fluid 110 from a superheated vapor to a saturated liquid. To this end, the condenser 130 may include coils or tubes through which the fluid 110 passes and across which cool air or cool liquid flows. As a result of the cool air or cool liquid passing across the coils of the condenser 130, the fluid 110 may reject or otherwise deliver heat from the refrigeration system 100 to the air or liquid which in turn carries the heat away.

The expansion valve 140 may receive the fluid 110 from the condenser 130 in a thermodynamic state known as a saturated liquid. The expansion valve 140 may abruptly reduce the pressure of the fluid 110. The abrupt pressure reduction may cause adiabatic flash evaporation of at least a portion of the fluid 110 which may lower the temperature of the fluid 110. In particular, the adiabatic flash evaporation may result in a liquid and vapor mixture of the fluid 110 that has a temperature that is colder than the temperature of the space to be cooled.

The evaporator 150 may receive the cold fluid 110 from the expansion valve 140 and may route the cold fluid 110 through coils or tubes of the evaporator 150. Warm air or liquid may be circulated from the space to be cooled across the coils or tubes of the evaporator 150. The warm air or liquid passing across the coils or tubes of the evaporator 150 may cause a liquid portion of the cold fluid 110 to evaporate. At the same time, the warm air or liquid passed across the coils or tubes may be cooled by the fluid 110, thus lowering the temperature of the space to be cooled. The evaporator 150 may deliver the fluid 110 to the suction port 122 of the compressor system 120 as a saturated vapor. Thus, the evaporator 150 may complete the refrigeration cycle and may return the fluid 110 to the compressor system 120 to be recirculated again through the compressor system 120, condenser 130, and expansion valve 140. Therefore, in the refrigeration system 100, the evaporator 150 may absorb and remove heat from the space to be cooled, and the condenser 130 may subsequently reject the absorbed heat to air or liquid that carries the heat away from the space to be cooled.

Figure 2:
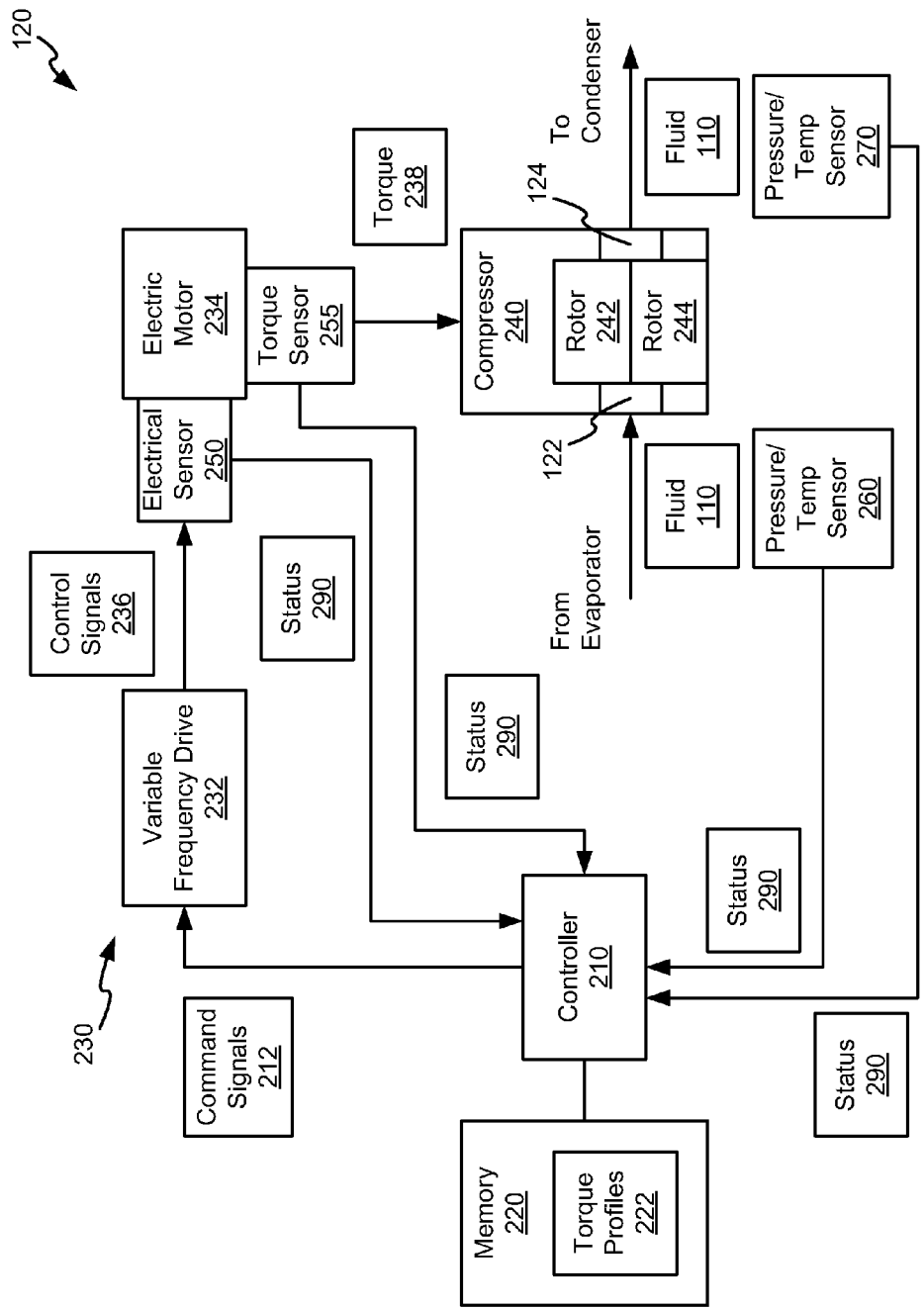
FIG. 2 shows additional details of the compressor system of FIG. 1.

Referring now to FIG. 2, further details regarding an embodiment of the compressor system 120 are presented. In particular, the compressor system 120 as shown may include a controller 210, memory 220, an electric motor system 230, and a screw compressor 240. The compressor system 120 may further include one or more electrical sensors 250, torque sensors 255, suction pressure and/or temperature sensors 260, and discharge pressure and/or temperature sensors 270. The sensors 250, 255, 260, 270 provide status signals 290 with measurements that are indicative of the operation of the screw compressor 240.

The controller 210 may include processors, microcontrollers, analog circuitry, digital circuitry, firmware, and/or software that cooperate to control operation of the screw compressor 240. The memory 220 may comprise non-volatile memory devices such as flash memory devices, read only memory (ROM) devices, electrically erasable/programmable ROM devices, and/or battery backed random access memory (RAM) devices to store an array of torque profiles 222 for the screw compressor 240 in a persistent manner. The memory 220 may further include instructions which the controller 210 may execute in order to control the operation of the screw compressor 240.

As explained in more detail below, the controller 210 may receive status signals 290 from one or more sensors 250, 255, 260, 270 of the compressor system 120 that provide information regarding operation of the screw compressor 240. Based upon the status signals 290, the controller 210 may determine an operating mode and/or operating point of the screw compressor 240 and may generate, based upon the determined operating mode and/or operating point, one or more command signals 212 to adjust the operation of the screw compressor 240. In particular, the controller 210 in one embodiment may select a torque profile 222 from the array of torque profiles 222 or may otherwise determine a torque profile 222 for the screw compressor 240 based upon the operating mode and/or operating point determined from the status signals 290. The controller 210 may then generate command signals 212 that request the electric motor system 230 to deliver torque 238 to the screw compressor 240 per the torque profile 222 obtained for the screw compressor 240.

The electric motor system 230 may drive the screw compressor 240 in response to command signals 212 received from the controller 210. In particular, the electric motor system 230 may include a variable frequency drive 232 and an electric motor 234. The electric motor 234 may be coupled to the screw compressor 240 to drive meshed screw rotors 242, 244 of the screw compressor 240. In one embodiment, the electric motor 234 may include a permanent magnetic motor that drives the rotors 242, 244 at a speed that is dependent upon the frequency of polyphase control signals 236 and at a torque 238 that is dependent upon the electric current supplied by the polyphase control signals 236. As shown, the variable frequency drive 232 may receive command signals 212 from the controller 210 and may generate the polyphase phase control signals 236. In particular, the variable frequency drive 232 may adjust the frequency and electric current of the polyphase control signals 236 based upon the command signals 212 received from the controller 210. As mentioned above, the controller 210 may generate the command signals 212 per a torque profile 222 selected for the screw compressor 240. As such, the variable frequency drive 232 in response to the command signals 212 adjusts the frequency and current of the control signals 236 per the torque profile 222 selected for the screw compressor 240.

As shown, the electrical sensor 250 may be positioned proximate the electric motor 234 to sense electrical operating characteristics of the electric motor 234. The electrical sensor 250 may further provide status signals 290 with measurements that are indicative of the sensed electrical operating characteristics. In one embodiment, the electrical sensor 250 may include one or more current sensors. The current sensors may be positioned to sense the electric current supplied by the control signals 236 to the electric motor 234 and may generate status signals 290 that are indicative of the sensed electric current. In one embodiment, the torque 238 produced by the electric motor 234 is dependent upon the electric current supplied by the control signals 236. Accordingly, status signals 290 indicative of the electric current supplied to the electric motor 234 may also be indicative of the torque 238 supplied by the electric motor 234. While the electrical sensor 250 in one embodiment comprises current sensors that sense current supplied to the electric motor 234, the electrical sensor 250 may sense other electrical operating characteristics of the electric motor 234 such as voltages, currents, phase angles, effective impedances at the input and/or other parts of the electric motor 234 and provide status signals 290 indicative of the sensed electrical operating characteristics.

As shown, the torque sensor 255 may be positioned proximate the electric motor system 230 to sense torque 238 applied by the electric motor system 230 to the screw compressor 240. The torque sensor 255 may further provide status signals 290 with measurements that are indicative of the sensed torque 238. In one embodiment, the torque sensor 255 may include one or more torsion elements positioned between the electric motor 234 and the compressor 240. The torque sensor 255 may then generate status signals 290 indicative of the torque 238 sensed by and/or applied to the torsion elements.

The screw compressor 240 may further include the suction port 122 and the discharge port 124 of the compressor system 120. As shown, the suction pressure and/or temperature sensor 260 may be positioned proximate the suction port 122 of the screw compressor 240 to sense pressure and/or temperature of the fluid 110 entering the suction port 122. Likewise, the discharge pressure and/or temperature sensor 270 may be positioned proximate the discharge port 124 of the screw compressor 240 to sense pressure and/or temperature of the fluid 110 discharged from the discharge port 124. Moreover, the suction pressure and/or temperature sensor 260 may provide status signals 290 with measurements that are indicative of the sensed pressure and/or temperature of the fluid 110 entering the suction port 122, and the discharge pressure and/or temperature sensor 270 may provide status signals 290 with measurements that are indicative of the sensed pressure and/or temperature of the fluid 110 discharged from the discharge port 124.

The screw compressor 240 may further include a plurality of meshed screw rotors 242, 244. The plurality of meshed screw rotors 242, 244 may define one or more compression pockets between the screw rotors 242, 244 and interior chamber walls of the screw compressor 240. Torque 238 supplied by the electric motor 234 may rotate the screw rotors 242, 244, thus closing the compression pocket from the suction port 122. Rotation of the screw rotors 242, 244 further decreases the volume of the compression pocket as the rotors 242, 244 move the fluid 110 toward the discharge port 124. Due to decreasing the volume of the compression pocket, the screw rotors 242, 244 deliver the fluid 110 to the discharge port 124 at an discharge pressure that is greater than the suction pressure and at a discharge temperature that is greater than the suction temperature.

The operation of the screw compressor 240 in compressing and moving the fluid 110 produces axial and radial forces. The interaction of the screw rotors 242, 244, the axial forces, and the radial forces may result in time varying and non-uniform rotor movements and forces against chamber walls, bearings, and end surfaces of the screw compressor 240. Lubricating oil provides cushioning films for the chamber walls, rotors 242, 244, and bearings of the screw compressor 240, but does not prevent the transmission of the time varying and non-uniform axial and radial forces. In selecting a torque profile 222 for the screw compressor 240, the controller 210 attempts to select a torque profile 222 that drives the screw compressor 240 in a manner which reduces the non-productive radial and axial forces.

Different screw compressor designs generally exhibit some unique operating characteristics and some common operating characteristics. A generally common operating characteristic of many screw compressor designs is that many screw compressor designs exhibit pulsating torque that is coincident with suction, compression, and discharge phases of the screw compressor. Other generally commonly operating characteristics include dynamic transmission of force from a male screw rotor to a meshed female screw rotor, and axial thrust of the screw rotors 242, 244.

Due to the unique operating characteristics of different screw compressor designs, experimental determinations may be made of various torque profiles 222 to identify beneficial torque profiles 222 for the screw compressor design in different operating modes and/or at operating points in such operating modes. In particular, the screw compressor 222 may be operated at different speeds, average motor currents, discharge pressures and/or temperatures, suction pressures and/or temperatures, and/or other operating parameters to obtain beneficial torque profiles 222 for the screw compressor 240 in various operating modes and/or operating points. For example, the screw compressor 240 may be operated in a start mode to obtain a starting torque profile 222, in an acceleration mode to obtain an acceleration torque profile 222, and in a deceleration mode to obtain a deceleration profile 222.

Based upon such experimentation, an array of torque profiles 222 for associated operating modes and/or operating points may be established for the screw compressor 240. In one embodiment, each torque profile of the array of torque profiles 222 comprises a pattern of the electric motor to compressor shaft torque values occurring during one or several motor revolutions. The pattern may be repetitive and may be defined over more than one complete motor revolution as one revolution of the motor may not equate to one revolution of the compressor driven rotors 242, 244. The length of the torque profile 222 may be defined as an integer number of revolutions which make the torque profile pattern repeat in sequence. The controller 210 may repetitively select and/or apply a torque profile 222 to achieve a desired control result.

Furthermore, in order to maintain a desired level of stability, the array of torque profiles 222 may be structured and torque profiles 222 may be selected by the controller 210 in manner that effects a stable control function of the screw compressor 240. In particular, the array of torque profiles 222 may be constructed to limit the rate at which the torque 238 is changed in order to maintain stability of the control function. In one embodiment, stability may be maintained by populating the array of torque profiles 222 with torque profiles 222 that maintain approximately equal rates of change. This may be accomplished by experimental determination of operating conditions of the screw compressor 240 at unequal operating point differences, and maintaining the torque profile differences in the array of torque profiles 222 to approximately equal values.

In one embodiment, the torque profiles 222 may be constructed to represent the torque control values directly as sampled points versus time. In another embodiment, the torque profiles 222 may be constructed to represent torque control values as integer harmonic multiples of a primary operating frequency of the screw compressor 240. In particular, the harmonics defining the torque profiles 222 may be expressed in terms of harmonic frequency amplitude and phase.

Figure 3:
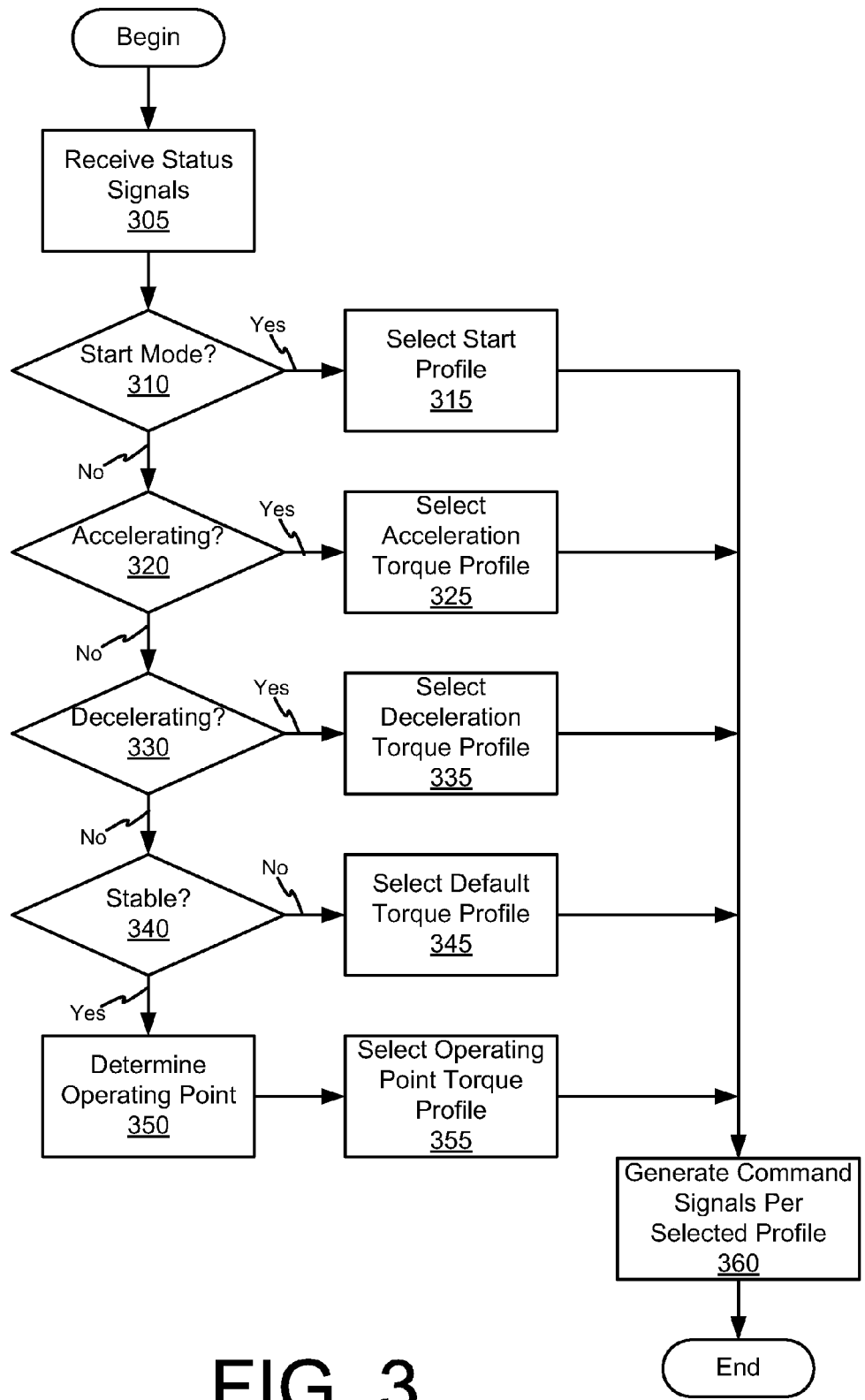
FIG. 3 shows a flowchart of a control method implemented by the compressor system of FIG. 1.

Referring now to FIG. 3, an embodiment of a control method that may be implemented by the controller 210 is shown. The controller 210 in one embodiment periodically executes the control method of FIG. 3 in order to adjust the torque profile 222 used to drive the screw compressor 240. At block 305, the controller 210 may receive status signals 290 from various sensors 250, 255, 260, 270 of the compressors system 120 that provide information regarding the present operation of the screw compressor 240. The controller 210 at block 310 may determine whether the screw compressor 240 is in a start mode. The controller 210 may determine whether the screw compressor 240 is in a start mode based upon data supplied by the status signals 290. The controller 210 may also determine whether the screw compressor 240 is in a start mode based upon other data of the refrigeration system 100. For example, the controller 210 may determine that the screw compressor 240 is in a start mode in response to a signal from a control panel or thermostat (not shown) that indicates the controller 210 is to turn on the refrigeration system 100 and start the screw compressor 240. In response to determining that the screw compressor 240 is in a start mode, the controller 210 may select a start torque profile 222 from the memory 220 at block 315.

In response to determining that the screw compressor 240 is not in a start mode, the controller 210 at block 320 may determine whether the screw compressor 240 is accelerating. In particular, the controller 210 based upon the status signals 290 may determine whether the rotation speed of the meshed rotors 242, 244 is increasing. In one embodiment, the controller 210 determines whether the screw compressor 240 is accelerating based upon several sampled points of the status signals 290 as well as an acceleration threshold level to ensure that minor fluctuations in the rotation speed of the meshed rotors 242, 244 during periods of stable or steady operation are not mistakenly interpreted as an acceleration of the rotors 242, 244. In response to determining that the screw compressor 240 is accelerating, the controller 210 may select an acceleration torque profile 222 from the memory 220 at block 325.

In response to determining that the screw compressor 240 is not accelerating, the controller 210 at block 330 may determine whether the screw compressor 240 is decelerating. In particular, the controller 210 based upon the status signals 290 may determine whether the rotation speed of the meshed rotors 242, 244 is decreasing. In one embodiment, the controller 210 determines whether the screw compressor 240 is decelerating based upon several sampled points of the status signals 290 as well as a deceleration threshold level to ensure that minor fluctuations in the rotation speed of the meshed rotors 242, 244 during periods of stable or steady operation are not mistakenly interpreted as a deceleration of the rotors 242, 244. In response to determining that the screw compressor 240 is decelerating, the controller 210 may select a deceleration torque profile 222 from the memory 220 at block 335.

In response to determining that the screw compressor 240 is not decelerating, the controller 210 at block 340 may verify that the operation of the screw compressor 240 is relatively stable or steady. During operation of the refrigeration system 100, the screw compressor 240 may experience periods of relatively stable or steady operation in which the rotation speed of the rotors 242, 244 is relatively constant, the suction pressure and/or temperature is relatively constant, and the discharge pressure and/or temperature is relatively constant. Accordingly, the controller 210 at block 340 may determine based upon the status signals 290 whether the screw compressor 240 is operating at a relatively stable or steady operating point. Similar to the above acceleration and deceleration determinations, the controller 210 may determine whether the screw compressor 240 is operating at a relatively stable or steady point based upon several sampled points of the status signals 290 as well as various threshold levels to ensure that minor fluctuations in the rotation speed, the suction pressure and/or temperature, and/or the discharge pressure and/or temperature do not result in a mistaken determination that the screw compressor 240 is not operating at a relatively stable or steady operating point. In response to determining that operation of the screw compressor 240 is not relatively stable or steady, the controller 210 may select at 345 a default torque profile 222 for the screw compressor 240 that results in the electric motor system 230 providing suitable torque 238 to the screw compressor 240 during periods not associated with starting, accelerating, decelerating, and/or stable operation.

In response to determining that operation of the screw compressor 240 is relatively stable, the controller 210 at block 350 may determine an operating point of the screw compressor 240 based upon the status signals 290. As mentioned above, the array of torque profiles 222 includes torque profiles 222 for the screw compressor 240 at various operating speeds, suction pressures and/or temperatures, and discharge pressures and/or temperatures. Thus, the controller 210 at block 355 may select, based upon the status signals 290, a torque profile 222 from the memory 220 that corresponds to the operating speed, suction pressure and/or temperature, and discharge pressure and/or temperature indicated by the status signals 290. In other embodiments, the controller 210 may select a plurality of torque profiles 222 from the memory 220 that are near the operating point indicated by the status signals 290 and may generate through interpolation from the selected torque profiles 222 a torque profile 222 for the screw compressor 240 operating at the indicated operating point.

At block 360, the controller 210 may generate command signals 212 that request the electric motor system 230 to supply torque 238 to the screw compressor 240 per the torque profile 222 selected for the screw compressor 240. As mentioned above, the screw compressor 240 generally exhibits pulsing torque due to the rotors 242, 244 receiving, compressing, and discharging fluid 110. The torque profiles 222 in one embodiment may be constructed to match the pulsing torque exhibited by the screw compressor 240. Accordingly, when switching from one torque profile 222 to another torque profile 222, the switch ideally is timed to coincide with the torque pulsations. To achieve such synchronization, the controller 210 generates the command signals 212 such that the electric motor system 230 effects the switch in torque profiles 222 in synchronization with the pulsing torque of the screw compressor 240. In other embodiments, synchronization may be achieved using other techniques. For example, the electric motor system 230 may sense the torque pulsations and switch the torque profiles 222 at an appropriate time.

Many modifications and variations of the disclosed embodiments are possible in light of the above teachings. Thus, it is to be understood that, within the scope of the appended claims, aspects of the disclosed embodiments may be practiced in a manner other than as described above.

What is claimed is:

1. A method to control operation of a compressor of a refrigeration system, comprising:
receiving status signals regarding a pulsing torque generated by one or more rotors of the compressor;

determining an operating point of the compressor based upon the received status signals;

determining a torque profile for the compressor based upon the operating point, wherein the determined torque profile represents variance in torque applied to the compressor during a revolution of the one or more rotors of the compressor; and adjusting torque applied to the compressor per the determined torque profile.

2. The method of claim 1, wherein determining the torque profile comprises obtaining a torque profile for the determined torque profile that matches the pulsing torque generated by the one or more rotors.

3. The method of claim 1, wherein the adjusting comprises timing a switch to the determined torque profile to coincide with torque pulsations of the pulsing torque generated by the one or more rotors.

4. The method of claim 1, wherein determining the torque profile comprises:

selecting one or more torque profiles based on the operating point as determined; and interpolating the determined torque profile from the one or more selected torque profiles.

5. A control system for controlling an electric motor and a compressor of a refrigeration system, comprising:

a memory with a plurality of stored torque profiles for the compressor; and a controller that:
(a) receives status signals regarding a pulsing torque generated by one or more rotors of the compressor,
(b) determines an operating point of the compressor based upon the received status signals,
(c) determines a torque profile for the compressor based upon the operating point and the plurality of stored torque profiles, wherein the determined torque profile represents variance in torque applied to the during a revolution of the one or more rotors of the compressor, and
(d) generates one or more control signals, per the determined torque profile, that adjust torque applied by an electric motor to the compressor per the determined torque profile.

6. The control system of claim 5, wherein the controller further obtains a torque profile for the determined torque profile that matches the pulsing torque generated by the one or more rotors.

7. The control system of claim 5, wherein the controller further times a switch to the determined torque profile to coincide with torque pulsations of the pulsing torque generated by the one or more rotors.

8. The control system of claim 5, wherein the controller further:

selects one or more torque profiles based on the operating point; and interpolates the determined torque profile from the one or more selected torque profiles.

9. A compressor system, comprising:

a compressor comprising one or more rotors configured to compress a fluid;

a controller that:
(a) receives status signals indicative of a pulsing torque generated by the one or more rotors of the compressor,
(b) determines a torque profile based upon the operating point of the compressor, and
(c) generates command signals that request torque be delivered to the compressor per the determined torque profile; and an electric motor system that receives the command signals from the controller and varies torque delivered to the compressor per the determined torque profile requested by the received command signals, wherein the determined torque profile represents variance in torque between the electric motor system and the compressor during a revolution of the electric motor system.

10. The compressor system of claim 9, wherein the controller further obtains a torque profile for the determined torque profile that matches the pulsing torque generated by the one or more rotors.

11. The compressor system of claim 9, wherein the controller further times a switch to the determined torque profile to coincide with torque pulsations of the pulsing torque generated by the one or more rotors.

12. The compressor system of claim 9, wherein the controller further:

selects one or more torque profiles based on the operating point; and interpolates the determined torque profile from the one or more selected torque profiles.

13. A compressor system, comprising:

a compressor comprising one or more rotors configured to compress a fluid;

an electric motor that receives control signals and to drive the one or more rotors per the received control signals;

a controller that receives status signals indicative of a pulsing torque generated by the one or more rotors of the compressor, determines a torque profile based upon the operating point of the compressor, and generates command signals that request the electric motor be driven per the determined torque profile; and a variable frequency drive that receives the command signals and generates the control signals that vary torque between the electric motor and the compressor per the determined torque profile, wherein the determined torque profile represents variance in torque between the electric motor and the compressor during a revolution of the electric motor.

14. The compressor system of claim 13, wherein the controller further obtains a torque profile for the determined torque profile that matches the pulsing torque generated by the one or more rotors.

15. The compressor system of claim 13, wherein the controller further times a switch to the determined torque profile to coincide with torque pulsations of the pulsing torque generated by the one or more rotors.

16. The compressor system of claim 13, wherein the controller further:

selects one or more torque profiles based on the operating point; and interpolates the determined torque profile from the one or more selected torque profiles.

* * * * *